3,095,410
DEAE SUBSTITUTED BALSA WOOD ION-EXCHANGE MATERIAL

Winston Kennay Anslow, Slough, England, assignor to Glaxo Group Limited, Greenford, England, a British company
No Drawing. Filed Dec. 23, 1960, Ser. No. 77,802
Claims priority, application Great Britain Dec. 28, 1959
4 Claims. (Cl. 260—231)

The present invention concerns improvements in or relating to cellulosic ion-exchange materials.

α-Cellulose powder has been modified by suitable treatment to yield products having anion or cation-exchange properties (Sobers and Peterson, J.A.C.S., 1954, 76, 1711–1712, ibid. 1956, 78(4), 751–755, Sobers et al., J.A.C.S., 1956 78(4), 756–763). One product having anion-exchange properties was obtained by treating strongly alkaline α-cellulose powder with 2-chloro-N,N-diethylethylamine. This product, referred to as DEAE-cellulose, has found application as an ion-exchange adsorbent for proteins and proteinaceous materials, e.g. enzymes, since relatively large amounts of protein may be adsorbed onto and eluted from DEAE-cellulose under mild conditions. α-Cellulose appeared particularly promising to the above workers because of its hydrophilic nature and large surface, the latter property being of importance in determining the adsorptive capacity of the modified DEAE-cellulose. The other factor affecting the adsorptive capacity of DEAE-cellulose is the number of active groups that can be introduced into the cellulose; experiments show, however, that the more diethylaminoethyl groups there are present, the more gelatinous and water-soluble becomes the cellulose so that in practice there is a limit to the number of ion-exchange groups which can be introduced, although diethylaminoethylation may not then be complete.

In the operation of ion-exchange processes on a commercial scale, it is generally preferable to employ a continuous, rather than a batchwise, process and, thus, in the case of DEAE-cellulose, it is desirable to have a material suitable for column operation. Ion-exchange materials suitable for commercial operation should thus possess, as far as possible, the following properties:

(1) A porous nature so that a large number of active groups is presented to the liquor being treated;

(2) A sufficiently open structure to permit a good flow of liquid through the column;

(3) An approximately standard particle size in order that, during packing of the column, the material is not segregated by differential sedimentation. A regular particle size also helps to prevent the occurrence of channelling and aids the maintenance of a regular flow throughout the cross-section of the column;

(4) The particles of the material should be sufficiently discrete, so that they do not clump or aggregate and so that the column of material may be backwashed and fluidised, for example to remove extraneous matter;

(5) The particles of the material should be sufficiently rigid in aqueous salt solutions and mild acid and alkaline reagents so that they maintain their physical form during adsorption, elution and regeneration and do not pack or settle to such an extent that the flow rate becomes impracticable.

DEAE-cellulose material as prepared by prior methods generally possesses the first of these properties but, because of its fine, slightly gelatinous, powder form, tends to clump very readily, cannot readily be backwashed and does not lead to a satisfactory flow rate. Furthermore, after a number of regenerations, it becomes too gelatinous to be of further use in a column.

Following research into the preparation of DEAE type ion-exchange material from a number of cellulose sources, we have discovered that one such source, namely balsa wood, enables a DEAE-cellulose ion-exchange material to be prepared which is satisfactory for operation in columns and to some extent approaches the desiderata for an ideal ion-exchange material mentioned above.

In accordance with the invention, therefore, we provide an ion-exchange material, comprising balsa wood bearing diethylaminoethyl substituents. This material we shall call "DEAE balsa" for the sake of brevity.

The material may be in any convenient form for example sheet form, although particulate form is preferred.

In the preparation of DEAE balsa the balsa wood is conveniently first processed into particles of a suitable size for use in an ion-exchange column before the introduction of the ion-exchange groups. The particles of balsa wood may be of any convenient size but preferably not larger than 10 British Standards mesh. We have found particles of between 16 and 60 British Standards mesh to be particularly satisfactory.

The balsa wood particles are then treated to introduce the diethylaminoethyl groups by any convenient method. They may, for example, be reacted with an alkali metal hydroxide followed by reaction with a diethylhaloethylamine, preferably in the form of a hydrohalide. It is particularly convenient to use caustic soda and diethylchloroethylamine.

The new ion-exchange material of this invention in general has a loose structure which is readily substituted by DEAE groups and which can be penetrated by molecules of substances to be adsorbed. Thus, particles of DEAE balsa in general present a large number of active groups to the liquor to be treated. For example, we have found that the ion-exchange material according to the invention can be prepared with exchange capacities of from about 0.3 to about 1.5 meq./g. (dry weight). Particularly useful material is that having an exchange capacity of from 0.6 to 1.5 meq./g. (dry weight). It should, however, be noted that if it is attempted to produce the new material with an exchange capacity much above 2 meq./g., the material may tend to gel or be water-soluble, as is the case with known DEAE-cellulose.

By suitable choice of particle size, a good flow of liquid through a column can be maintained and, in particular, better flow rates can be obtained than with DEAE-celluloses hitherto available.

DEAE balsa according to this invention in general possesses good stability, including stability to alkalis. It may be regenerated several times with little alteration in its properties, although change in volume may be observed, the flow rate, however, remaining in general fairly constant.

The DEAE balsa of this invention may be used for the adsorption of many substances. Thus, for example, while it may generally be used wherever DEAE-cellulose has hitherto been used, e.g. for separation and purification of proteins, etc., we have found that the new material is very useful in the purification and/or concentration of fungal α-amylase, the purification and/or concentration of poliomyelitis virus and the acids derived from vitamin $B_{12}$ by hydrolysis (by adsorption), and vitamin $B_{12}$ (by adsorption of impurities while the vitamin passes through the column). DEAE balsa is also useful for removing impurities from ostreogrycin factors A and B.

In order that the invention may be well understood, the following examples are given by way of illustration only:

EXAMPLE 1

Preparation of DEAE Balsa

Balsa sawdust (5 kg., 16–60 mesh) was mixed in a horizontal mixer with sodium hydroxide solution (26 l. 5.75 N) for one hour. 2(N,N-diethyl)amino-ethylchloride (5 kg.) dissolved in water (7.5 l.) was added and the mixture stirred at room temperature for 16 hours. Hydrochloric acid (25 l., 5 N) was added with cooling and the resultant slurry filtered and washed with water; this yielded DEAE balsa (5 kg., dry weight) having an exchange capacity of 1.38 meq./gm. (dry weight).

EXAMPLE 2

Use of DEAE Balsa in the Preparation of Fungal α-Amylase

Sufficient DEAE balsa (wet screened 16–26 mesh) was prepared to give a 5'8" bed in a 6" diameter glass column of total height 10 feet (bed volume approximately 31.2 l.). The bed was buffered with 2 bed volumes 0.045 M sodium phosphate to pH 6.5 at a flow rate of 1.25 bed volumes per hour. 8.5 bed volumes of fungal α-amylase broth, obtained by culturing *Aspergillus oryzae* (dextrinising activity 16.4 u./ml. i.e. total activity 4,320 kilo-units) previously adjusted to pH 6.5 were fed into the column at a rate of 1 bed volume per hour, followed by 1 bed volume water. The column effluent showed a total activity of 120 kilo-units (adsorption efficiency 97.2%). The adsorbed fungal α-amylase was recovered by washing with 1 bed volume 1.6 M sodium acetate buffer pH 4.7, followed by a water wash of 0.65 bed volume per hour. 1 bed volume of this eluate contained 3,615 kilo-units of dextrinising activity (86.5% recovery, representing an eightfold concentration). A further 420 kilo-units were recovered from the eluate representing a total elution recovery of 96%.

EXAMPLE 3

Isolation of Acids Obtained by Hydrolysis of Vitamin $B_{12}$ 19.4 g. of vitamin $B_{12}$ were dissolved in 4 litres of 0.1 N hydrochloric acid. The solution was left for 23 hours at 37° C., then for 10 hours at room temperature. The coloured material was extracted with phenol, the extract was washed twice with its own volume of water, then phenol was removed by ether extraction in the presence of water.

A column of DEAE balsa prepared from balsa sawdust of dry particle size of 16–40 mesh as described in Example 1 was set up in a 4½" diameter tube, to give a packed height of 10". The vitamin $B_{12}$ hydrolysate was put onto the column, and followed by water, at a flow rate of about 2 litres per hour. Unchanged vitamin $B_{12}$ passed through quickly into the effluent, leaving the acidic hydrolysis products adsorbed on the DEAE balsa.

The effluent, containing 11.5 g. vitamin $B_{12}$ in a volume of 3 litres, was treated with 30 ml. of concentrated hydrochloric acid and left for 24 hours at 37° C., then for 10 hours at room temperature to obtain a further yield of the required acid. The solution was freed from mineral acid via phenol as above, and run through the same column, followed by water.

The effluent contained 6.75 g. of vitamin $B_{12}$ in a volume of 2.8 litres. 4.6 g. vitamin $B_{12}$ and 28 ml. concentrated HCl were added and the solution was left for 40 hours at 37° C. It was again extracted via phenol and put onto the same DEAE balsa column. The water effluent contained 6.1 g. of unchanged vitamin $B_{12}$. After washing with about 10 litres of water to remove the last traces of vitamin $B_{12}$ the required monobasic acid (12.0 g.) was eluted with 10 litres of 0.01 N sodium chloride. The corresponding dibasic acid (5.5 g.) was then eluted with 7 litres of 0.1 N sodium chloride.

EXAMPLE 4

Purification of Crude Vitamin $B_{12}$ With DEAE Balsa

Two experiments were performed using DEAE balsa obtained as described in Example 1 from balsa of dry particle size of 16–40 mesh.

The vitamin $B_{12}$ preparation used in the experiments was a red solution containing between 0.2 and 0.25 g. of vitamin $B_{12}$ and about seven grams of solids per litre.

(a) In the first experiment ten litres of this material were extracted into phenol-chloroform (2:1) and regenerated into about 1500 ml. of water by addition of acetone/ether (1:2) until all the colour passed into the aqueous layer on shaking. This solution, containing traces of phenol and small amounts of acetone and ether, and which was 60% pure as determined by colorimetric and total solids estimations, was passed through a 5" depth of DEAE cellulose in a 1" diameter chromatographic column at a rate of 500 ml. per hour. The effluent from this column (72% pure) was concentrated in vacuo, filtered through kieselguhr and crystallised from acetone. The crystals were dissolved in hot water and recrystallised.

(b) In the second experiment a further ten litres of the above partially purified preparation were adsorbed on a mixture of 150 g. of charcoal plus 30 g. of kieselguhr in a 3" chromatographic column. After washing with water 60% aqueous acetone was passed through the charcoal giving a 70% pure eluate. The acetone was removed with diethyl ether and the mainly aqueous solution containing the vitamin $B_{12}$ was passed through a 4" depth of DEAE cellulose in a 1" diameter chromatographic column at a rate of 500 ml. per hour. The effluent (76% pure) was concentrated in vacuo and crystallised from acetone. The crystals were redissolved in hot water and filtered through kieselguhr before recrystallisation.

The crystals from these experiments and a check sample of normal production vitamin $B_{12}$ were dried overnight at 105° C. under vacuum. The purities of the dried crystals determined by colorimetric assay of solutions of weighed amounts were 94% from the first experiment, 95% from the second and 92% for the check sample.

EXAMPLE 5

Purification of Type 1 Polio Virus 3. g. balsa wood DEAE prepared as described in Example 1 from balsa wood of particle size of 16–40 mesh were suspended in 0.02 M phosphate buffer (pH 7.0) to give a column 21 x 110 mm. The virus fluid used was type 1, Titre: $10^{-7.1}$, Monkey kidney antigen (M.K.):1/512. 5 ml. of the virus solution were passed through the column at 1.5–2.0 ml./minute and then developed with a 0.02 M phosphate buffer (pH 7.0). The "hold-up" liquid (30 ml.) was discarded, and the eluate then collected in about 5 ml. portions.

The results are shown below:

| | Vol., ml. | Titre | Percent activity | M.K. | Percent M.K. |
| --- | --- | --- | --- | --- | --- |
| Starting material | 5 | 7.1 | 100 | 1/512 | 100 |
| 1st eluate | 6.5 | 5.7 | 5 | 1/3 | <1 |
| 2nd eluate | 5.0 | 6.9 | 63 | 1/8 | <2 |
| 3rd eluate | 5.5 | 6.5 | 27.5 | 1/6 | 1 |
| 4th eluate | 5.1 | 6.3 | 27.5 | 1/6 | 1 |
| Total eluated | | | 123 | | <5 | the four eluates contained all the input activity and less than 5% of the Monkey kidney protein antigen.

EXAMPLE 6

Use of Balsa DEAE Cellulose for Purification of E.129

25 g. of ostreogrycin from which the factor Z had been removed (using cellulose phosphate) was dissolved in 200 ml. of 70% methanol, and the solution passed through a column of Balsa DEAE cellulose 4" high in a column 2½" in diameter. The column was washed with 70% methanol until the effluent no longer gave a green colour reaction with ferric chloride, and the washings added to the eluate. The total methanol solution was then concentrated under reduced pressure to a volume of approx.

imately 200 ml. and the precipitated pale yellow antibiotic mixture was recovered by filtration.

I claim:

1. An ion-exchange material in particulate form consisting essentially of N,N-diethylaminoethylated balsa wood prepared by reacting substantially uniformly sized particulate balsa wood with an alkali metal hydroxide, thereafter reacting the resultant product with an N,N'-diethylhaloethylamine until ion-exchange capacity of 0.3 to 1.5 meq./g., dry weight, is introduced into said balsa wood and then separating said particulate ion-exchange balsa wood.

2. An ion-exchange material as claimed in claim 1 in which the particles are less than 10 British Standards mesh in size.

3. An ion-exchange material as claimed in claim 3 in which the particles are between 16 and 60 British Standards mesh in size.

4. An ion-exchange material as claimed in claim 1 having an exchange capacity of 0.6 to 1.5 meq./g., dry weight.

References Cited in the file of this patent

UNITED STATES PATENTS

| 2,618,634 | Vaughn | Nov. 18, 1952 |
| 2,623,041 | Grassie | Dec. 23, 1952 |
| 2,946,724 | Valentine | July 26, 1960 |
| 2,966,443 | Cox | Dec. 27, 1960 |

OTHER REFERENCES

J.A.c.s., vol. 78, 1956, pp. 751 to 755.
J.A.c.s., vol. 80, 1958, pp. 3949 to 3956.